(12) United States Patent
Bardwell

(10) Patent No.: US 8,302,911 B2
(45) Date of Patent: Nov. 6, 2012

(54) AIRCRAFT STRUCTURE

(75) Inventor: Anthony Bardwell, Luton (GB)

(73) Assignee: GKN Aerospace Services Limited, East Cowes (GB)

( * ) Notice: Subject to any disclaimer, the term of this patent is extended or adjusted under 35 U.S.C. 154(b) by 642 days.

(21) Appl. No.: 12/374,168

(22) PCT Filed: Jul. 17, 2007

(86) PCT No.: PCT/GB2007/002698
§ 371 (c)(1),
(2), (4) Date: Dec. 3, 2009

(87) PCT Pub. No.: WO2008/009921
PCT Pub. Date: Jan. 24, 2008

(65) Prior Publication Data
US 2010/0102172 A1 Apr. 29, 2010

(30) Foreign Application Priority Data
Jul. 18, 2006 (GB) .................................. 06124244.2

(51) Int. Cl.
*B64D 15/12* (2006.01)
(52) U.S. Cl. .................................................. 244/134 D
(58) Field of Classification Search ............... 244/134 D, 244/117 R, 134 R, 134 B
See application file for complete search history.

(56) References Cited

U.S. PATENT DOCUMENTS

| 2,297,540 | A | | 9/1942 | Driscoil | |
|---|---|---|---|---|---|
| 4,021,008 | A | * | 5/1977 | Eichenauer | 244/134 D |
| 5,011,098 | A | * | 4/1991 | McLaren et al. | 244/134 B |
| 5,807,454 | A | * | 9/1998 | Kawabe et al. | 156/214 |
| 5,921,502 | A | * | 7/1999 | Al-Khalil et al. | 244/134 R |
| 6,119,978 | A | * | 9/2000 | Kobayashi et al. | 244/35 R |
| 6,193,192 | B1 | * | 2/2001 | Porte | 244/134 B |
| 6,267,328 | B1 | * | 7/2001 | Vest | 244/134 B |
| 6,467,730 | B2 | * | 10/2002 | Laugt | 244/134 B |
| 7,078,658 | B2 | * | 7/2006 | Brunner et al. | 219/529 |
| 7,708,227 | B2 | * | 5/2010 | Al-Khalil | 244/134 D |
| 7,854,412 | B2 | * | 12/2010 | Al-Khalil | 244/134 R |
| 7,878,460 | B2 | * | 2/2011 | Armstrong et al. | 244/214 |
| 7,900,872 | B2 | * | 3/2011 | Sternberger | 244/134 C |

FOREIGN PATENT DOCUMENTS

| EP | 0 893 342 A2 | 1/1999 |
|---|---|---|
| EP | 0 939 028 A3 | 3/2000 |
| GB | 740106 | 11/1955 |
| GB | 1 012 165 | 12/1965 |
| GB | 1 306 062 | 2/1970 |
| GB | 2 218 473 A | 11/1989 |
| GB | 0614244.2 | 11/2006 |

OTHER PUBLICATIONS

The International Search Report and Written Opinion as mailed on Sep. 25, 2007 for International Patent Application PCT/GB2007/002698.

* cited by examiner

*Primary Examiner* — Richard Price, Jr.
(74) *Attorney, Agent, or Firm* — Quarles & Brady LLP

(57) ABSTRACT

A heated leading edge component for an aircraft and a method of manufacture thereof. The leading edge component includes an outer skin, a supporting rib for the outer skin, and a cavity located substantially in-between the outer skin and the rib for receiving a heater. The rib is attached to the outer skin on either side of the cavity.

22 Claims, 6 Drawing Sheets

AIRCRAFT STRUCTURE

CROSS REFERENCE TO RELATED APPLICATIONS

This application represents the national stage application of International Application PCT/GB2007/002698 filed 17 Jul. 2007, which claims the benefit of Great Britain Patent Application 0614244.2 filed 18 Jul. 2006, which are incorporated herein by reference in their entirety for all purposes.

BACKGROUND OF THE INVENTION

This invention relates to an aircraft structure. In particular, this invention relates to a heated leading edge component for an aircraft.

Leading edge components of an aircraft such as a wing slat or propeller are generally heated to reduce the build up of ice which could interfere with the operation of the component to the determent of the safety of the aircraft.

In some known designs, hot gas is bled from the engines of the aircraft and redirected to blow over the leading edge component for heating purposes. In an alternative heating system, heater mats can be attached to a surface of the leading edge component for heating the component. Heater mats of this kind are known in the art and generally comprise a laminar electrically resistive element through which a current can be passed for producing Joule heating for heating the leading edge component.

Leading edge components such as a wing slat typically include an outer skin which is aerodynamically shaped for the function of the component. An example is shown in FIGS. 1 and 2. FIG. 1 shows a wing 12 of an aircraft 10 with a wing slat 14. FIG. 2 shows a cut away view of the wing 12 shown in FIG. 1. In this example, the wing 12 includes a box portion 16 which is substantially rigid and which provides structural strength for the wing 12. The box portion 16 can also house one or more fuel tanks. The rear of the wing 18 generally includes wing components such as flaps. In this example, toward the front of the wing 12, a leading edge component, namely a wing slat 14 is provided. The wing slat 14 includes an outer skin 24 and is supported by a number of ribs 30. A plurality of such ribs can be provided along a length of the wing slat 14 for providing structural strength. The wing 12 can also include further elements such as a Kruger flap 20, which in this example can pivot (as shown generally by the arrow labelled A in FIG. 2) out from the wing for the modifying the aerodynamic characteristics of the wing 12.

As is shown in FIG. 3, the supporting ribs 30 of the wing slat 14 can be attached at right angles to the outer skin 24 for providing structural support. In FIG. 3, the attachment of the rib 30 can be achieved by providing the rib with a flange 32, which can itself be attached to the outer skin 24 using means such as an adhesive or sealant 34 located in a layer substantially in-between the flange 32 and the outer skin 24, and/or using a plurality of rivets 18 which pass through the flange and the outer skin 24. In some alternative designs, a L-shaped rib can be employed in an arrangement which effective comprises a flanged rib with a flanged portion only extending to one side of the rib, unlike the T-shaped ribs shown in FIGS. 3 to 5.

As is shown in FIG. 4, an arrangement of the kind shown in FIG. 3 can be provided with means for heating the leading edge component. These means can include one or more heater mats 40, which can be mounted on the outer skin and/or mounted on the flange 32.

FIG. 5 shows an alternative heating arrangement, in which a heater mat 40 is mounted directly on the outer skin 24 and the flange 32 is then mounted on top of the heater mat 40.

There are a number of problems associated with the mounting arrangements described above in relation to FIGS. 3 to 5.

Firstly, it should be noted that where attachment of a flange 32 to the outer skin 24 is provided for using rivets or similar means, the region of the flange 32 labelled "Z" in FIG. 3 is in fact mechanically redundant as it does not provide any additional support for the rib. Instead, the region Z of the flange 32 serves only to transfer the load between the rib 30 and the attachment means for example rivets 18. Similar considerations apply in the case of L-shaped ribs.

Secondly, and with reference to FIG. 4, where heaters such as heater mats 40 are provided on either side of the flange and also on top of the flange 32, this can complicate the control system used to regulate the temperature of the outer skin 24. This is because the heaters 40 which are provided on the flange 32 need to operate at a higher power output than the heaters 40 which are provided on either side of the flange 32, since the former heaters must heat the outer skin 24 via the material of the flange 32, while the latter heaters can apply heat directly to the outer skin 24. This substantially complicates the heating arrangement and the control system which is used to regulate the power to the heaters.

Moreover, the fact that the heaters 40 mounted on the flange 32 require additional power increases the energy requirements for the heater system. Additionally, the higher temperatures at which the heaters 40 on the flange 32 need to operate may be damaging to the materials of the rib 30, the flange 32 and/or the adhesive layer 34.

Regarding the arrangement shown in FIG. 5, while the heater 40 is continuously applied to the outer skin 24 whereby good heating can be achieved, there are may structural and safety issues associated with this design.

For example, since the heater 40 is located adjacent the adhesive layer 34, heat degradation of the adhesive may occur—this is especially dangerous in the event of overheating in the heater. Over heating may be due to, for example, a failure in the power control system. In another example, a failure in the heater can occur if the leading edge suffers some kind of mechanical impact such as hail stones, bird strike or service vehicle accidents. Such damage can cause rupture of the heater and lead to local overheating until such time the control system can detect the failure and shut down that part of the system.

Furthermore, the interposition of the heater mat 40 between the flange 32 and the outer skin 24 inhibits effective and reliable attachment of the flange 32 to the outer skin 24. Also, maintenance of the heater 40 is made complicated by the fact that the portion beneath the flange 32 cannot be accessed without removing the rib 30.

This invention has been made in consideration of at least some of the problems indicated above.

SUMMARY OF THE INVENTION

Particular and preferred aspects of the invention are set out in the accompanying independent and dependent claims. Combinations of features from the dependent claims may be combined with features of the independent claims as appropriate and not merely as explicitly set out in the claims.

According to an aspect of the invention, there can be provided a heated leading edge component for an aircraft. The component includes an outer skin. The component also includes a supporting rib for the outer skin. The component further includes a cavity located substantially in-between the outer skin and the rib. The rib includes a first wall and a second wall forming the cavity. Each wall is attached at one end to the outer skin on either side of the cavity. The component also includes a heater received within the cavity.

The presence of a cavity substantially in-between the outer skin and the rib allows the area in the vicinity of the rib to be more effectively heated, since a heater can be provided in close proximity to the outer skin in that region without the structural and/or heat control problems of prior arrangements. The cavity is located in an area which is redundant in traditional rib designs.

The cavity can be elongate run along the rib. In this way, an elongate heater can be provided within the cavity for providing effective heating along a length of the rib.

The cavity can take a number of alternative forms. Fir example, it can be substantially triangular, substantially semicircular or substantially square in cross-section.

The walls of the rib can protect and hold in place a heater provided within the cavity. Each wall can be flanged for attachment to the outer skin on either side of the cavity. Since the load on the rib is shared between the two walls, smaller flanges can be used than in known systems. This reduces some of the heating problems associated with known systems using a single flange when a heater is attached thereof.

The heater can be removably received so that it can be replaced during maintenance operations. The heater can be flexible for conforming with an inner surface of the cavity, thereby simplifying the installation and/or removal process. The heater can be configured to be pulled and/or pushed along the cavity during removal and/or replacement. The heater can include a heater mat attached to an elongate flexible portion.

In one embodiment, the walls of the rib can straddle the heater. The walls of the rib can have a substantially V-shaped, U-shaped, square-shaped or oblong-shaped configuration in cross section to form, for example, a correspondingly shaped cavity.

According to another aspect of the invention, there can be provided an aircraft including the heated leading edge component described above.

According to a further aspect of the invention, there can be provided a method of maintaining the leading edge component of the kind described above, that includes a removable heater. The method includes removing the heater from the cavity. The method also includes inserting a replacement heater in an opening at one end of the cavity and moving the heater along a length of the cavity until it is in place.

According to another aspect of the invention, there can be provided a method of manufacturing a leading edge component for an aircraft. The method includes attaching a supporting rib to an outer skin of the component to form a cavity located substantially in-between the outer skin and the rib for receiving a heater. The rib includes a first wall and a second wall for forming the cavity. Attaching the supporting rib includes attaching one end of each wall of the rib to the outer skin on either side of the cavity. The method also includes installing a heater in the cavity.

The cavity can be elongate and can run along a length of the rib, and in such cases the method can include pulling and/or pushing the heater along the cavity.

In one embodiment, the walls of the rib can straddle the heater. The walls of the rib can have a substantially V-shaped, U-shaped, square-shaped or oblong-shaped configuration in cross section to form, for example, a correspondingly shaped cavity.

BRIEF DESCRIPTION OF THE DRAWINGS

For a better understanding of the invention and to show how the same may be carried into effect reference is now made by way of example only to the accompanying drawings in which like reference signs relate to like elements and in which.

Figure 1:
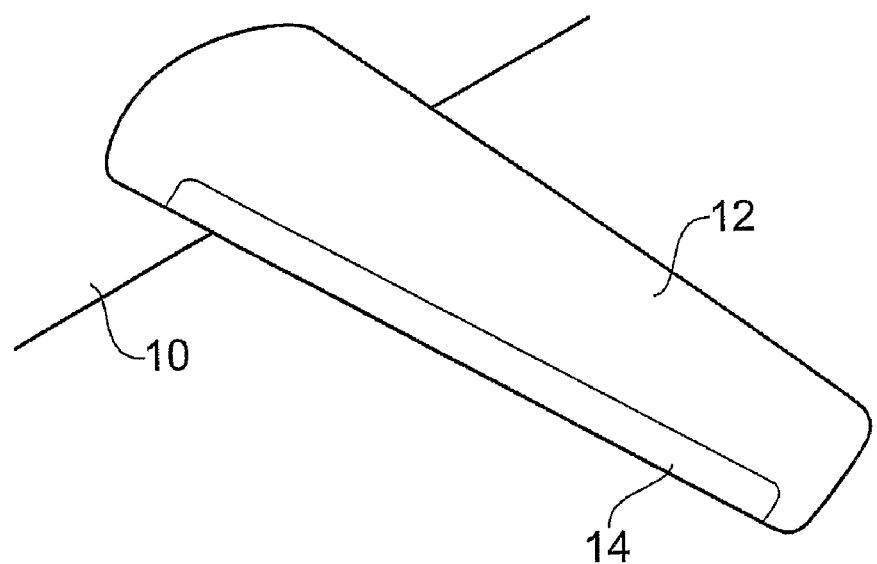
FIG. 1 schematically shows a wing of an aircraft and an example of a leading edge component, namely a wing slat.
Figure 2:
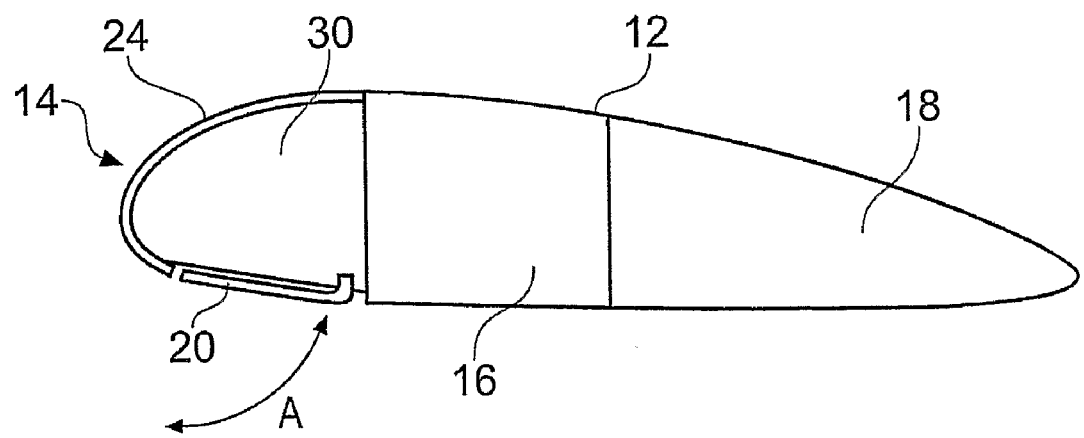
FIG. 2 schematically shows a cut-away view of the wing shown in FIG. 1.
Figure 3:
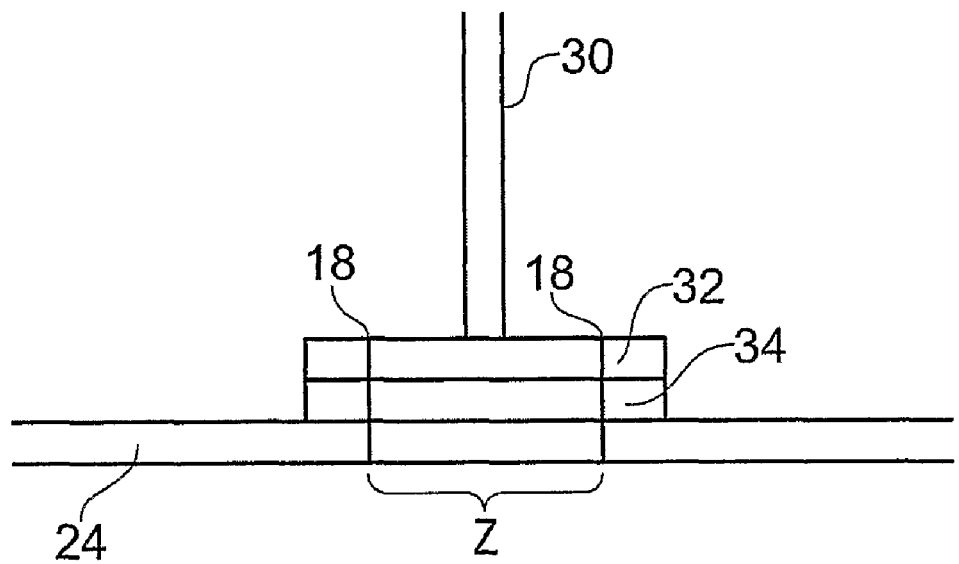
FIGS. 3 to 5 schematically show examples of rib mounting arrangements for a leading edge component, and some example heating arrangements therefor.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DESCRIPTION OF PARTICULAR EMBODIMENTS

Particular embodiments will now be described by way of example only in the following with reference to the accompanying drawings.

According to an embodiment of this invention, there can be provided a heated leading edge component of an aircraft in which a cavity is located substantially in-between an outer skin of the leading edge and a supporting rib of the leading edge component. This cavity is suitable for receiving a heater, whereby effective heating can be provided in the region of the join-between a rib and an outer skin of the leading edge component.

Figure 6:
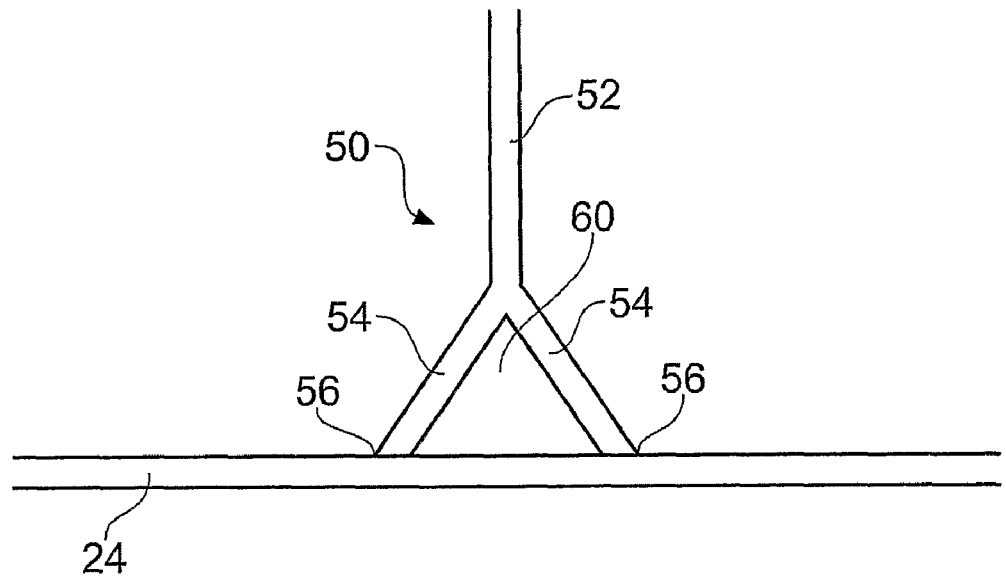
FIGS. 6 to 9 schematically show examples of a rib mounting arrangement for a leading edge component in accordance with an embodiment of this invention.

A first example of such an arrangement is shown in FIG. 6. The arrangement in FIG. 6 includes an outer skin 24 to which a supporting rib 52 is attached. The outer skin may typically be constructed from a metal, for example titanium. In this example, the supporting rib 52 is attached on either side of a cavity 60, which is located substantially in-between the rib 52 and the outer skin 24.

In this example, the cavity 60 is defined by two walls 54, which extend outwardly from the rib 52 and are attached at one end 56 to the outer skin 24. The rib 52 and walls 54 can, for example, be made from a single-piece construction.

In accordance with an embodiment of the invention, the walls can straddle the cavity. This can allow the walls to define the cavity for receiving the heater, in cooperation with the outer skin 24 to which the rib 52 is attached. The walls may thus hold in place a heater that is received within the cavity. In one embodiment of the invention, the walls can at least partially encircle the cavity (and a heater received within the cavity).

Typical materials for the constructed of the rib include aluminium alloys, titanium, carbon fibre composites and stainless steel.

A number of alternative means can be used for attaching the rib 52 to the outer skin 24. For example, adhesive and/or attachment means such as bolts or rivets could be used to attach the ends 56 of the walls 54 to the outer skin 24. As shown in FIG. 6, the location of the cavity 60, allows a heater to be located directly beneath the rib 52 and adjacent the outer skin 24 for effective heating in the vicinity of the rib 52.

Figure 4:
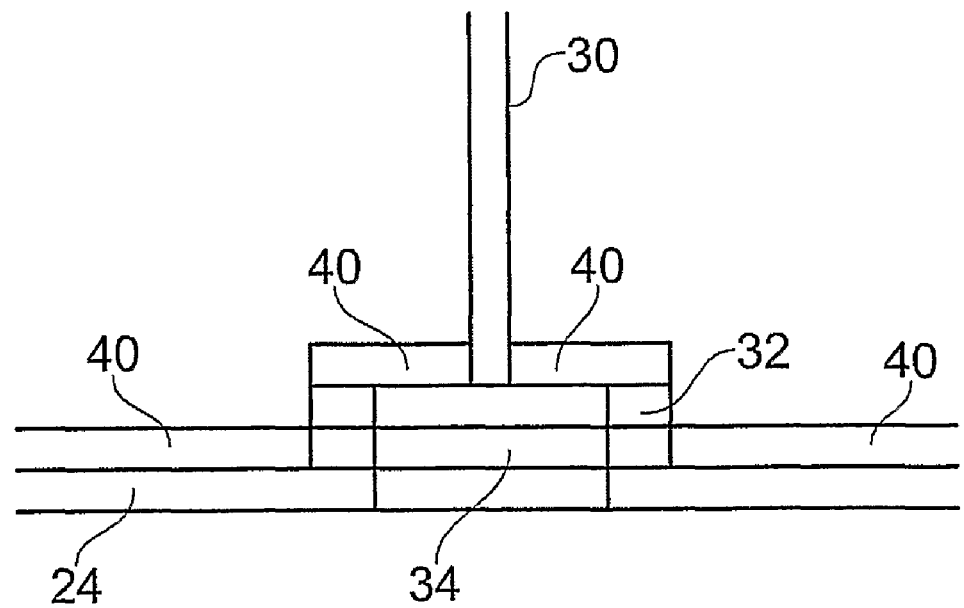
Figure 5:
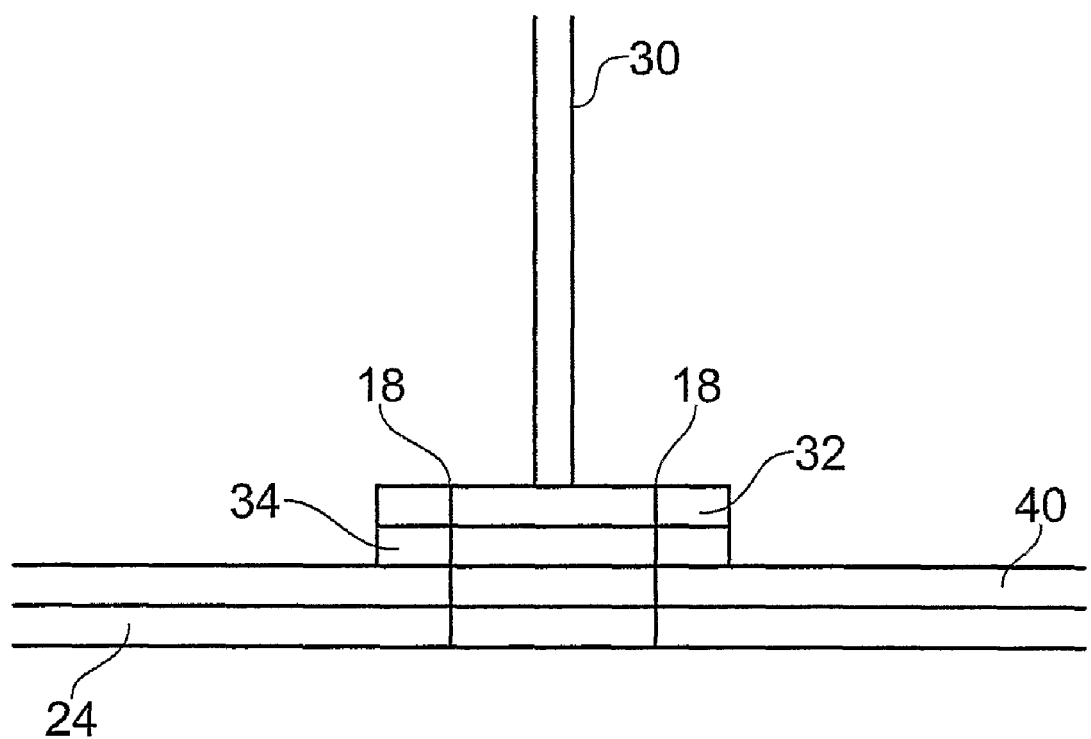
Figure 7:
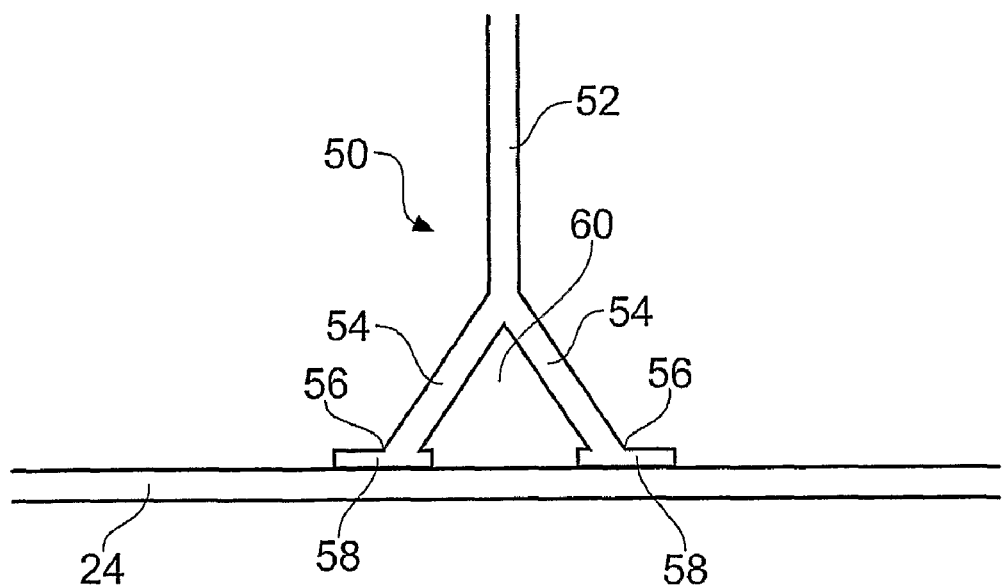

As shown in FIG. 7, the ends 56 of the walls 54 can include flanges 58 for effecting attachment of the rib 52 to the outer skin 24. As the load on the rib 52 is shared between the attachments of the rib on either side of the cavity 60 (in this example, at the flanges 58), lower tolerance attachment means can be employed. For example, in FIG. 7, the flanges 58 are substantially smaller than the flange shown in FIG. 4. This can mean that a smaller area of the outer skin 24 is obscured by attachment of the rib 52 than in known systems, whereby supplying heat to those attachment regions is simplified. For example, in FIG. 7, where heaters are installed in the cavity 60 and also on either side of the flanges 58 at the exterior of the cavity 60, the problems associated with heating the region of the outer skin beneath the flanges 58 are mitigated because the heaters are closer to the obscured regions of the outer skin 24 than would be the case if a single large flange were provided as described above. In some examples, heaters can also be provided on top of the flanges 58 in a manner similar to that described in relation to known systems.

Figure 8:
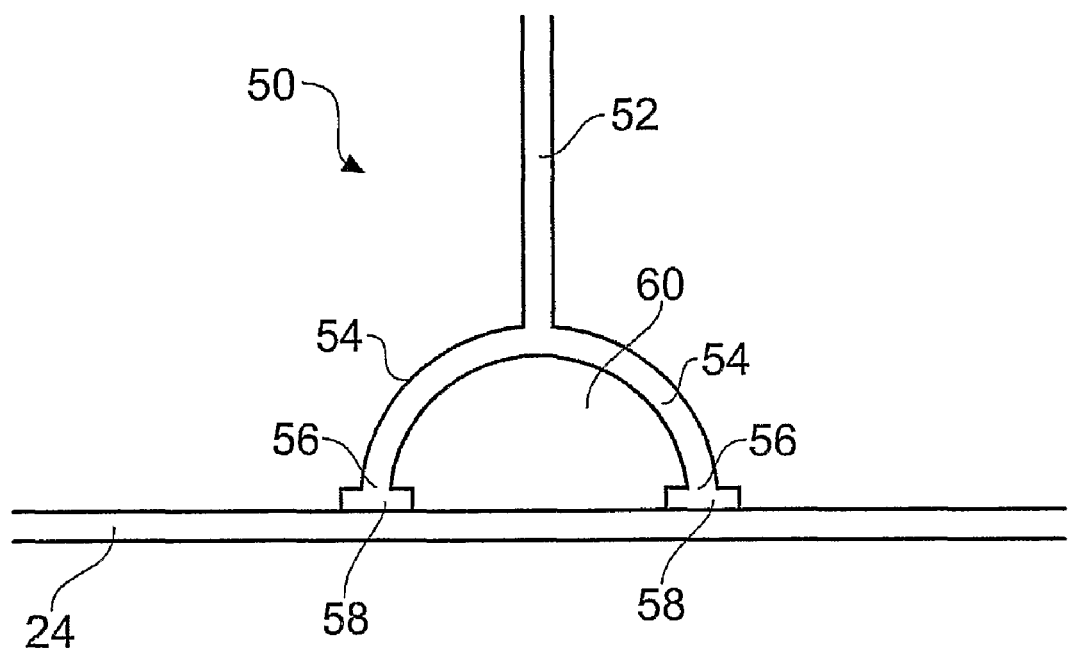

In the examples described above in relation to FIGS. 6 and 7, the cavity 60 is substantially triangular as defined by the walls 54. However, it is envisaged that other cross-sectional shapes for the cavity 60 could be employed. One such example is shown in FIG. 8, in which a substantially semicircular cavity 60 is defined by the walls 54. In other examples, other cross-sectional shapes could be employed such as a substantially square or oblong cross-sectional shape or indeed an irregular shape. The walls 54 may be arranged to form, for example, a V-shaped (see, for example, FIGS. 7 and 7), U-shaped (see, for example, FIG. 8) square-shaped or oblong-shaped cross section for defining an appropriately shaped cavity.

As described above, the cavity 60 is located substantially in-between the rib 52 and the outer skin 24 and the rib 52 is attached (in this example using flanges 58) to the outer skin 24 on either side of the cavity 60.

Figure 9:
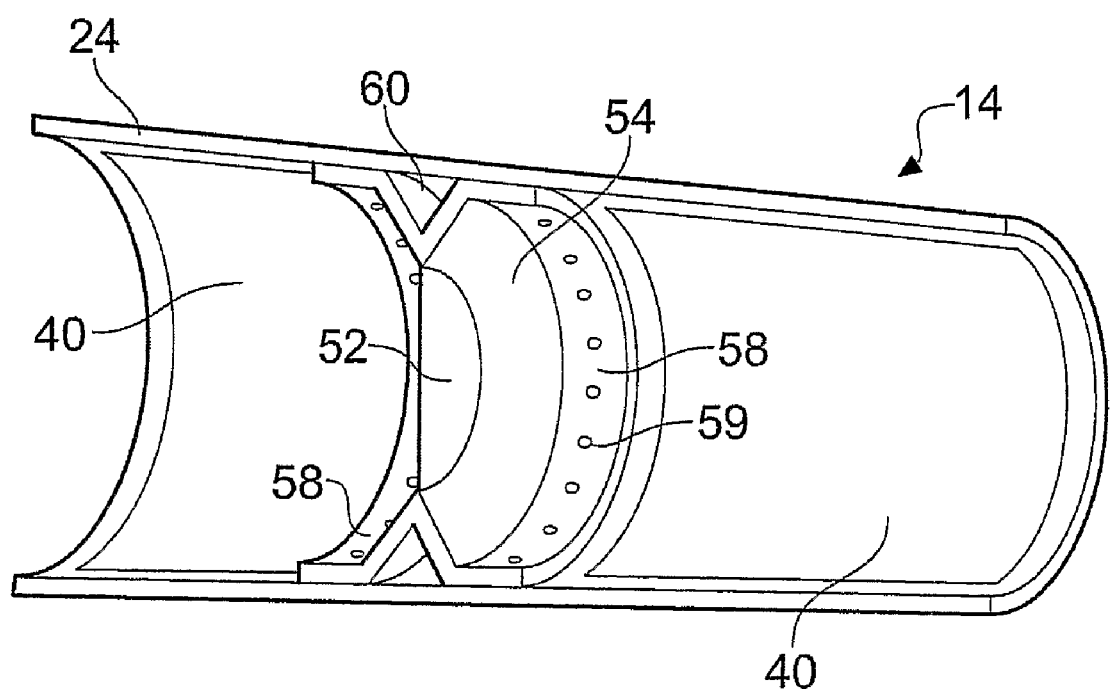

FIG. 9 shows another example of a leading edge component (wing slat 14) and a rib 52 with a cavity 60 located substantially in-between the rib 52 and an outer skin 24 of the leading edge component. As is shown in FIG. 9, the cavity 60 can be elongate and run along a length of the rib 52. The rib 52 can conform with a shape of the leading edge component and the elongate cavity 60 can thus also conform with the shape of the leading edge component, whereby a heater provided within the cavity 60 can provide effective heating in the locality of the entire of the rib.

In the example shown in FIG. 9, heaters 40 are provided on either side of the rib 52. As described, a heater can be received within the cavity 60. A plurality of ribs 52 of this kind can be provided along a length of the leading edge component 14 for providing effective ice protection.

Figure 10:
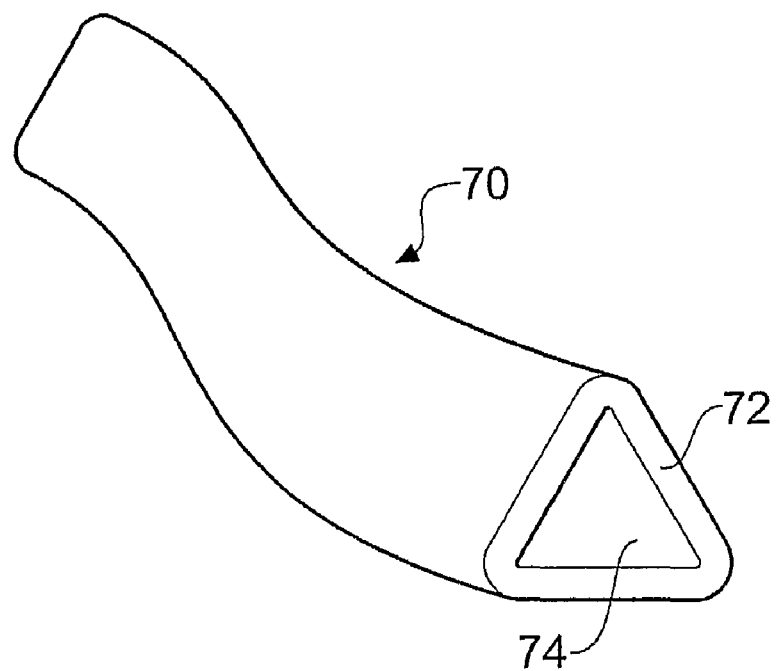
FIG. 10 schematically shows an example of a heater for use with a leading edge component in accordance with an embodiment of this invention.

FIG. 10 shows an example of a heater 70 which can be received within the cavity 60. The heater 70 can be substantially flexible to allow it to conform with the elongate shape of the cavity 60 along the length of the rib 52. Heaters can be removably received within the cavity so that, in the event of a failure in a heater, the faulty heater can be removed and then replaced during maintenance works.

In the example shown in FIG. 10, the heater 70 includes an electrically insulating portion 72 which surrounds a heated portion 74 which can be heated by means of electrical resistive elements. The insulating portion 72 can serve to electrically and thermally insulate the heated portion 74 from other components of the leading edge such as the walls 54 flanges 58 or outer skin 24 which may all be metallic and electrically conductive.

In another example, a heater mat can be attached to a flexible portion such as an elongate piece of rubber. The rubber can be configured to press the heater mat against the outer skin 24 within the cavity 60. The rubber and heater mat can be elongate in a manner similar to that shown in FIG. 10 so that it can provide heating along the full length of the cavity 60.

As shown in FIG. 10, the heater can be substantially the same shape (in terms of cross-section) as the cavity 60. For example, in FIG. 10 the heater 70 is substantially triangular in cross-section for use with a triangular cavity such as that shown in FIGS. 6, 7 and 9. Where the heater 70 is constructed having a cross-sectional shape which is substantially similar to the cross-sectional shape of the cavity 60, this can improve heat transfer to the outer skin 24, since the heater 70 fits snugly within the cavity 60 and presses against the outer skin 24.

In accordance with an embodiment of the invention, heaters of the kind described in co-pending UK Patent Application Numbers 0605453.3 and/or 0610258.6 can be employed inside and/or outside the cavity 60.

A method of manufacturing a leading component for an aircraft of the kind described above can include attaching a supporting rib to an outer skin of the component. For example, in relation to FIG. 9 it can be seen that attachment may be achieved using one or more screws bolts or rivets 59 provided in a flange 58 of the rib 52. When the rib 52 is attached to the outer skin 24, this forms the cavity 60. As is clear from FIG. 9, the cavity 60 can be formed from an inner surface of the walls 54 and a surface of the outer surface 24.

Subsequent to attaching the rib 52 to the outer skin 24 thereby forming the cavity 60, a heater can be installed in the cavity.

Installation of a heater within the cavity 60 can be achieved using any suitable means. In one particular example, an elongate heater can be fed in one end of the cavity 60 and then pushed and/or pulled along the cavity until it is in place. To pull the heater along the cavity 60, a lead wire or such like could be first be fed into the cavity at one end and then pulled out of the other end of the cavity 60, thereby to drag the heater along the cavity's length. Electrical connections for the heater can be provided at either end of the cavity and or can be fed through the cavity as appropriate.

Where the heater is a removably received heater, removal of the heater could be achieved by, for example, simply pulling on one end of the heater and/or pushing on the other end of the heater until the heater is completely removed from the cavity. A replacement heater can then be installed in the manner described above.

In the examples described above, the walls 54 are solid. However, in other examples the walls 54 could include apertures or openings. Such openings may reduce the weight of the rib 52 albeit at the cost of a reduction in structural strength. Where openings of this kind are provided, access to a heater received within the cavity 60 could be achieved without having to remove the heater from the cavity 60.

Accordingly there has been described a heated leading edge component for an aircraft and a method of manufacture thereof. The leading edge component includes an outer skin, a supporting rib for the outer skin, and a cavity located substantially in-between the outer skin and the rib for receiving a heater. The rib is attached to the outer skin on either side of the cavity.

The invention claimed is:

1. A heated leading edge component for an aircraft, the component comprising: an outer skin; a supporting rib for the outer skin; a cavity located substantially in-between the outer skin and the rib, wherein the rib comprises a first wall and a second wall forming the cavity, wherein each wall is attached at one end to the outer skin on either side of the cavity; and a heat source received within the cavity.

2. The heated leading edge component of claim 1, wherein the cavity is elongate and runs along the rib.

3. The heated leading edge component of claim 1, wherein the cavity is substantially triangular, substantially semi-circular or substantially square in cross-section.

4. The heated leading edge component of claim 1, wherein each wall comprises a flange for attachment to the outer skin on either side of the cavity.

5. The heated leading edge component of claim 4, wherein at least one of the flanges has the heat source attached thereto.

6. The heated leading edge component of claim 1, wherein the heat source is removably received within the cavity.

7. The heated leading edge component of claim 6, wherein the heat source is flexible for conforming with an inner surface of the cavity.

8. The heated leading edge component of claim 7, wherein the heat source comprises a heater mat attached to an elongate flexible portion.

9. A method of maintaining the leading edge component of claim 6, the method comprising: removing the heat source from the cavity; and inserting a replacement heat source in an opening at one end of the cavity and moving the heat source along a length of the cavity until it is in place.

10. The heated leading edge component of claim 1, wherein the heat source is configured to be pulled and/or pushed along the cavity during removal and/or replacement.

11. The heated leading edge component of claim 1, wherein the walls of the rib straddle the heat source.

12. The heated leading edge component of claim 11, wherein the walls of the rib have a substantially V-shaped, U-shaped, square-shaped or oblong-shaped configuration in cross section.

13. An aircraft comprising the heated leading edge component of claim 1.

14. A method of manufacturing a leading edge component for an aircraft, the method comprising: attaching a supporting rib to an outer skin of the component to form a cavity located substantially in-between the outer skin and the rib for receiving a heat source, wherein the rib comprises a first wall and a second wall for forming the cavity, and wherein attaching the supporting rib comprises attaching one end of each wall of the rib to the outer skin on either side of the cavity; and installing the heat source in the cavity.

15. The method of claim 14, wherein the cavity is elongate and runs along a length of the rib, and wherein the method includes pulling and/or pushing the heat source along the cavity.

16. The method of claim 14, wherein the walls of the rib straddle the heat source.

17. The method of claim 16, wherein the walls of the rib have a substantially V-shaped, U-shaped, square-shaped or oblong-shaped configuration in cross section.

18. A heated leading edge component for an aircraft, the component comprising: an outer skin; a supporting rib for the outer skin; a cavity located substantially in-between the outer skin and the rib, wherein the rib comprises a first wall and a second wall forming the cavity, wherein each wall is attached at one end to the outer skin on either side of the cavity; and a heater received within the cavity wherein each wall comprises a flange for attachment to the outer skin on either side of the cavity and at least one of the flanges has the heater attached thereto.

19. A heated leading edge component for an aircraft, the component comprising: an outer skin; a supporting rib for the outer skin; a cavity located substantially in-between the outer skin and the rib, wherein the rib comprises a first wall and a second wall forming the cavity, wherein each wall is attached at one end to the outer skin on either side of the cavity; and a heater removably received within the cavity wherein the heater is flexible for conforming with an inner surface of the cavity and the heater comprises a heater mat attached to an elongate flexible portion.

20. A heated leading edge component for an aircraft, the component comprising: an outer skin; a supporting rib for the outer skin; a cavity located substantially in-between the outer skin and the rib, wherein the rib comprises a first wall and a second wall forming the cavity, wherein each wall is attached at one end to the outer skin on either side of the cavity; and a heater received within the cavity wherein the walls of the rib straddle the heater.

21. A method of maintaining a heated leading edge component in which the heated leading edge component includes an outer skin, a supporting rib for the outer skin, a cavity located substantially in-between the outer skin and the rib in which the rib comprises a first wall and a second wall forming the cavity wherein each wall is attached at one end to the outer skin on either side of the cavity, and a heater removably received within the cavity, the method comprising:
   removing the heater from the cavity; and
   inserting a replacement heater in an opening at one end of the cavity and moving the replacement heater along a length of the cavity until it is in place.

22. A method of manufacturing a leading edge component for an aircraft, the method comprising: attaching a supporting rib to an outer skin of the component to form a cavity located substantially in-between the outer skin and the rib for receiving a heater, wherein the rib comprises a first wall and a second wall for forming the cavity, wherein attaching the supporting rib comprises attaching one end of each wall of the rib to the outer skin on either side of the cavity, and wherein the walls of the rib straddle the heater; and installing a heater in the cavity.

* * * * *